United States Patent
Iwatsuki et al.

(10) Patent No.: US 7,780,570 B2
(45) Date of Patent: Aug. 24, 2010

(54) APPARATUS FOR AND METHOD OF CONTROLLING POWER TRAIN, AND STORAGE MEDIUM STORING PROGRAM FOR IMPLEMENTING THE METHOD

(75) Inventors: Kunihiro Iwatsuki, Toyota (JP); Takaaki Tokura, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 492 days.

(21) Appl. No.: 11/984,520

(22) Filed: Nov. 19, 2007

(65) Prior Publication Data
US 2008/0146413 A1    Jun. 19, 2008

(30) Foreign Application Priority Data
Dec. 15, 2006    (JP) .............................. 2006-338535

(51) Int. Cl.
*B60W 10/00* (2006.01)
(52) U.S. Cl. ................ 477/78; 477/132; 477/135; 477/139; 477/140; 477/144
(58) Field of Classification Search ............ 477/70, 477/73, 74, 75, 77, 78, 80, 84, 86, 87, 91, 477/132, 135, 139, 140, 143, 144, 148, 180, 477/181
See application file for complete search history.

(56) References Cited
U.S. PATENT DOCUMENTS
7,211,028 B2 * 5/2007 Matsumura et al. ......... 477/124
7,291,092 B2 * 11/2007 Tohta et al. .................. 477/98

FOREIGN PATENT DOCUMENTS

| DE | 694 29 946 T2 | 6/2002 |
|---|---|---|
| DE | 600 30 663 T2 | 10/2007 |
| JP | A-03-084259 | 4/1991 |
| JP | A-11-013869 | 1/1999 |
| JP | A-2004-204960 | 7/2004 |
| JP | A-2004-316575 | 11/2004 |
| JP | A-2004-316838 | 11/2004 |
| JP | A-2005-313840 | 11/2005 |

OTHER PUBLICATIONS

German Office Action issued in Application No. 10 2007 059 472.2-14 (with English translation); mailed on Oct. 20, 2009.

* cited by examiner

*Primary Examiner*—David D Le
(74) *Attorney, Agent, or Firm*—Oliff & Berridge, PLC

(57) ABSTRACT

An ECU executes a program for implementing a method that includes: a step of performing control so that torque capacity Tch of a frictional engagement device that is brought from an engaged state into a disengage state by a downshift operation is gradually reduced to start an inertia phase when a power-on downshift is performed; and a step of stopping the gradual reduction of the torque capacity Tch when the rate of change in an input shaft rotation speed NI of an automatic transmission has reached a desired rate of change ΔN(1). Variation in output torque is kept small, and the shock that can occur at the time of a shift is thus reduced.

11 Claims, 10 Drawing Sheets

FIG. 3

| | C1 | C2 | C3 | C4 | B1 | B2 | F |
|---|---|---|---|---|---|---|---|
| P | × | × | × | × | × | × | × |
| R1 | × | × | ○ | × | × | ○ | × |
| R2 | × | × | × | ○ | × | ○ | × |
| N | × | × | × | × | × | × | × |
| 1ST | ○ | × | × | × | × | ◎ | △ |
| 2ND | ○ | × | × | × | ○ | × | × |
| 3RD | ○ | × | ○ | × | × | × | × |
| 4TH | ○ | × | × | ○ | × | × | × |
| 5TH | ○ | ○ | × | × | × | × | × |
| 6TH | × | ○ | × | ○ | × | × | × |
| 7TH | × | ○ | ○ | × | × | × | × |
| 8TH | × | ○ | × | × | ○ | × | × |

○ ENGAGED

× DISENGAGED

◎ ENGAGED WHEN ENGINE BRAKING IS APPLIED

△ ENGAGED WHEN VEHICLE IS DRIVEN BY ENGINE

APPARATUS FOR AND METHOD OF CONTROLLING POWER TRAIN, AND STORAGE MEDIUM STORING PROGRAM FOR IMPLEMENTING THE METHOD

INCORPORATION BY REFERENCE

The disclosure of Japanese Patent Application No. 2006-338535 filed on Dec. 15, 2006 including the specification, drawings and abstract is incorporated herein by reference in its entirety.

BACKGROUND OF THE INVENTION

1. Field of the Invention

The present invention relates to an apparatus for and a method of controlling a power train, and a storage medium in which a program for implementing the method is stored. More specifically, the present invention relates to a technology for controlling a power train that is connected to an automatic transmission, and that includes a driving power source whose output torque is boosted during a downshift.

2. Description of the Related Art

In a vehicle on which an automatic transmission is mounted in which one of a plurality of gears is established by selectively engaging a plurality of frictional engagement devices, a gear is established corresponding to a combination of the frictional engagement devices that are engaged. Accordingly, downshifts and upshifts are performed by bringing the frictional engagement device that is in an engaged state into a disengaged state, and bringing another frictional engagement device that is in a disengaged state into an engaged state.

In such an automatic transmission, the torque that the frictional engagement devices can transmit temporarily drops in the course of a shift. For this reason, there is a case where the output torque from the automatic transmission is increased stepwise as the shift operation progresses after the output torque from the automatic transmission temporarily drops. When the output torque is increased stepwise, a shock occurs. Technologies for increasing the output torque from a driving power source, that is, the input torque supplied to the automatic transmission during a shift, and thereby suppressing a drop in the output torque to reduce such a shock, are available.

Japanese Patent Application Publication No. 2004-316838 (JP-A-2004-316838) describes a shift controller for an automatic transmission that causes a motive power source, such as an engine, to perform a torque boost operation to make a shift operation progress as planned. The shift controller described in JP-A-2004-316838 includes: an upper limit value-calculating section for, when a shift is commanded, calculating an upper limit value of the torque from a motive power source that can be produced under a shift operation; a power source torque-calculating section for, when a shift is commanded, calculating the torque from the motive power source that the motive power source produces under the torque boost operation; an engagement pressure-setting section for setting, based on the upper limit value, a desired engagement pressure of gear-shifting friction devices whose state should be changed at the time of a shift when it is determined that the torque from the motive power source exceeds the upper limit value based on the signals from these sections when a shift is commanded; a torque-controlling section for, when the torque from the motive power source exceeds the upper limit value, controlling the motive power source so that the output torque from the motive power source is equalized to the upper limit value; and an engagement-controlling section for controlling the gear-shifting friction devices so that engagement pressure is equalized to the desired engagement pressure in the course of a shift when the motive power source torque exceeds the upper limit value. When it is determined that the motive power source torque exceeds the upper limit value in the course of a downshift, a speed of reduction of the engagement pressure of the friction devices (frictional engagement devices) that should be brought from an engaged state into a disengaged state is set based on the upper limit value of the motive power source torque. The friction devices are controlled so that the engagement pressure is reduced at a desired engagement pressure reduction speed.

The shift controller described in this official gazette compensates for the shortage in the torque boost amount due to the upper limit value by adjusting the engagement pressure of the gear-shifting friction devices. In this way, it is possible to certainly absorb and reduce the output torque shock immediately after a torque phase of a shift. Thus, it is possible to ensure a sufficient measure against the shift shock.

However, even when such a torque boost operation is performed during a shift as in the case of the shift controller described in JP-A-2004-316838, gradual reduction of torque capacity (engagement force) of a frictional engagement device in the course of a shift can cause a situation where the reduction in the output torque from the automatic transmission in an inertia phase of a downshift is not sufficiently prevented. As a result, the output torque can sharply vary in the course of a shift to cause a shock when, for example, the output torque from the automatic transmission varies stepwise in the course of transition from an inertia phase to a torque phase.

SUMMARY OF THE INVENTION

An object of the present invention is to provide an apparatus for and a method of controlling a power train that reduce the shock that can occur in the course of a shift, and a storage medium storing a program for implementing the method.

An apparatus for controlling a power train according to a first aspect of the present invention is an apparatus for controlling a power train that includes: an automatic transmission that performs a downshift from a higher gear to a lower gear, wherein a frictional engagement device that is in an engaged state is brought into a disengaged state; and a driving power source connected to the automatic transmission, wherein output torque from the driving power source is boosted during the downshift of the automatic transmission. The control apparatus includes: means for controlling the frictional engagement device so that an inertia phase is started at the time of the downshift by gradually reducing torque capacity of the frictional engagement device; and means for stopping the gradual reduction of the torque capacity of the frictional engagement device when at least one of rate of change in rotation speed of a rotary member of the automatic transmission, and rate of change in speed ratio of the automatic transmission has reached a predetermined value. A method of controlling a power train according to a fifth aspect of the present invention includes substantially the same features as those of the apparatus for controlling a power train according to the first aspect.

According to the first or fifth aspect, an inertia phase is started at the time of the downshift by gradually reducing the torque capacity of the frictional engagement device that is brought from an engaged state into a disengaged state. When at least one of the rate of change in the rotation speed of the rotary member (the input shaft, for example) of the automatic transmission, and the rate of change in the speed ratio of the automatic transmission has reached a predetermined value, the gradual reduction of the torque capacity of the frictional engagement device is stopped. Thus, it is possible to prevent the torque capacity of the frictional engagement device from being unnecessarily reduced. Accordingly, it is possible to keep small the variation in the output torque from the automatic transmission during transition from an inertia phase to a torque phase by preventing the torque transmitted to the output shaft from being reduced during the inertia phase. Thus, it is possible to provide an apparatus for and a method of controlling a power train that reduce the shock that can occur at the time of a shift.

An apparatus for and a method of controlling a power train according, to the first and fifth aspects may further include means and a step, respectively, that, after the gradual reduction of the torque capacity of the frictional engagement device is stopped, controls the torque capacity of the frictional engagement device according to input torque supplied to the automatic transmission, and controls the torque capacity of the frictional engagement device so that at least one of the rate of change in the rotation speed of the rotary member of the automatic transmission, and the rate of change in the speed ratio of the automatic transmission is maintained at the predetermined value.

According to this aspect, after the gradual reduction of the torque capacity of the frictional engagement device is stopped, the torque capacity of the frictional engagement device is controlled according to input torque supplied to the automatic transmission, and the torque capacity of the frictional engagement device is controlled so that at least one of the rate of change in the rotation speed of the rotary member of the automatic transmission, and the rate of change in the speed ratio of the automatic transmission is maintained at the predetermined value. Thus, it is possible to prevent excess and deficiency of the torque capacity of the frictional engagement device in relation to the input torque supplied to the automatic transmission. In addition, it is possible to prevent the torque capacity of the frictional engagement device from being unnecessarily reduced. Thus, it is possible to keep small the variation in the output torque from the automatic transmission during transition from an inertia phase to a torque phase by preventing the torque transmitted to the output shaft from being reduced in the inertia phase. As a result, it becomes possible to reduce the shock that can occur at the time of a shift.

An apparatus for controlling a power train according to a second aspect of the present invention is an apparatus for controlling a power train that includes: an automatic transmission that performs a downshift from a higher gear to a lower gear, wherein a first frictional engagement device that is in an engaged state is brought into a disengaged state, and a second frictional engagement device that is in a disengaged state is brought into an engaged state; and a driving power source connected to the automatic transmission, wherein output torque from the driving power source is boosted during the downshift of the automatic transmission. The control apparatus includes: means for controlling the power train so that rotation speed of an input shaft of the automatic transmission becomes higher than a synchronized rotation speed with respect to the lower gear within a predetermined range in an inertia phase of the downshift; means for performing control so that torque capacity of the first frictional engagement device is gradually reduced, and that torque capacity of the second frictional engagement device is gradually increased when the rotation speed of the input shaft of the automatic transmission becomes higher than the synchronized rotation speed with respect to the lower gear within the predetermined range in the inertia phase of the downshift; and means for performing control so that reduction of an amount of boost of the output torque from the driving power source is started after the rotation, speed of the input shaft is reduced to the synchronized rotation speed. A method of controlling a power train according to a sixth aspect of the present invention includes substantially the same features as those of the apparatus for controlling a power train according to the second aspect.

With these aspects, the power train is controlled so that rotation speed of an input shaft of the automatic transmission becomes higher than a synchronized rotation speed with respect to the lower gear within a predetermined range in an inertia phase of the downshift. In addition, control is performed so that torque capacity of the first frictional engagement device that is brought from an engaged state into a disengaged state at the time of the downshift is gradually reduced, and that torque capacity of the second frictional engagement device that is brought from a disengaged state into an engaged state is gradually increased when the rotation speed of the input shaft of the automatic transmission becomes higher than the synchronized rotation speed with respect to the lower gear within the predetermined range in the inertia phase of the downshift. Thus, it is possible to start the gradual reduction of the torque capacity of the first frictional engagement device and the gradual increase of the torque capacity of the second frictional engagement device under conditions in which the rotation speed of the input shaft of the automatic transmission is higher than the synchronized rotation speed with respect to the lower gear, and thus to reduce the rotation speed of the input shaft to the synchronized rotation speed. Reduction of the rotation speed of the input shaft to the synchronized rotation speed is controlled more easily than increase of the rotation speed of the input shaft to the synchronized rotation speed. Thus, it is possible to keep small the variation in the output torque from the automatic transmission during a shift by smoothly reducing the rotation speed of the input shaft to the synchronized rotation speed. Moreover, control is performed so that reduction of the amount of boost of the output torque from the driving power source is started after the rotation speed of the input shaft is reduced to the synchronized rotation speed. As a result, during the period from when gradual reduction of the torque capacity of the first frictional engagement device and gradual increase of the torque capacity of the second frictional engagement device are started to when rotation speed of the input shaft is reduced to the synchronized rotation speed, that is, at the final stage of the inertia phase, the output torque from the engine is not varied, and only the torque capacities of the two frictional engagement devices are varied. Varying only the torque capacities of two frictional engagement devices is controlled more easily than varying the output torque from the driving power source in addition to the torque capacities of two frictional engagement devices. Thus, it is possible to keep variation in the output torque from the automatic transmission small. Thus, it is possible to provide an apparatus for and a method of controlling a power train that reduce the shock that can occur at the time of a shift.

An apparatus for controlling a power train according to a third aspect of the present invention is an apparatus for controlling a power train that includes: an automatic transmission that performs a downshift from a higher gear to a lower gear, wherein a first frictional engagement device that is in an engaged state is brought into a disengaged state, and a second frictional engagement device that is in a disengaged state is brought into an engaged state; and a driving power source connected to the automatic transmission, wherein output torque from the driving power source is boosted during the downshift of the automatic transmission. The control apparatus includes means for performing control so that torque capacity of the first frictional engagement device and torque capacity of the second frictional engagement device are gradually reduced and increased, respectively, in an inertia phase, while maintaining a relation between the torque capacities such that the output torque from the automatic transmission at the end of the inertia phase of the downshift and the output torque from the automatic transmission at the start of a subsequent torque phase of the downshift are equalized to each other. A method of controlling a power train according to a seventh aspect of the present invention includes substantially the same features as those of the apparatus for controlling a power train according to the third aspect.

According to the third or seventh aspect, in the inertia phase, the torque capacity of the first frictional engagement device is gradually reduced, and the torque capacity of the second frictional engagement device is gradually increased, while maintaining a relation between the torque capacities such that the output torque from the automatic transmission at the end of the inertia phase and the output torque therefrom at the start of the subsequent torque phase are equalized to each other. In this way, the curves of the output torque from the automatic transmission are smoothly connected at the point of the transition from an inertia phase to a torque phase. Thus, it is possible to keep small the variation in the output torque from the automatic transmission during transition from an inertia phase to a torque phase. As a result, it becomes possible to provide an apparatus for and a method of controlling a power train that reduce the shock that can occur at the time of a shift.

An apparatus for controlling a power train according to a fourth aspect of the present invention is an apparatus for controlling a power train that includes: an automatic transmission that performs a downshift from a higher gear to a lower gear, wherein a frictional engagement device that is in an engaged state is brought into a disengaged state; and a driving power source connected to the automatic transmission, wherein output torque from the driving power source is boosted during the downshift of the automatic transmission. The control apparatus includes: means for performing control so that reduction of the amount of boost of the output torque from the driving power source and reduction of torque capacity of the frictional engagement device in a torque phase of the downshift are synchronously started; and means for performing control so that the reduction of the amount of boost of the output torque from the driving power source and the reduction of the torque capacity of the frictional engagement device in the torque phase of the downshift are synchronously completed. A method of controlling a power train according to an eighth aspect of the present invention includes substantially the same features as those of the apparatus for controlling a power train according to the fourth aspect.

According to the fourth or eighth aspect, reduction of the amount of boost of the output torque from the driving power source and reduction of torque capacity of the frictional engagement device in a torque phase of the downshift are synchronously started. Similarly, the reduction of the amount of boost of the output torque from the driving power source and the reduction of the torque capacity of the frictional engagement device in the torque phase of the downshift are synchronously completed. Thus, it is possible to prevent the torque capacity of the frictional engagement device from becoming excessive or insufficient in relation to the output torque from the driving power source, that is, the input torque supplied to the automatic transmission during the torque phase. Thus, it is possible to keep variation in the output torque from the automatic transmission small. As a result, it becomes possible to provide an apparatus for and a method of controlling a power train that reduce the shock that can occur at the time of a shift.

A storage medium according to a ninth aspect of the present invention is a computer-readable storage medium storing a program that causes a computer to perform the control method according to the fifth aspects.

According to the ninth aspect, it is possible to implement the method of controlling a power train according to the fifth aspects with the use of a computer, which may be either a general-purpose computer or a special-purpose computer.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 shows an operational table of the automatic transmission;

DETAILED DESCRIPTION OF EMBODIMENTS

Figure 1:
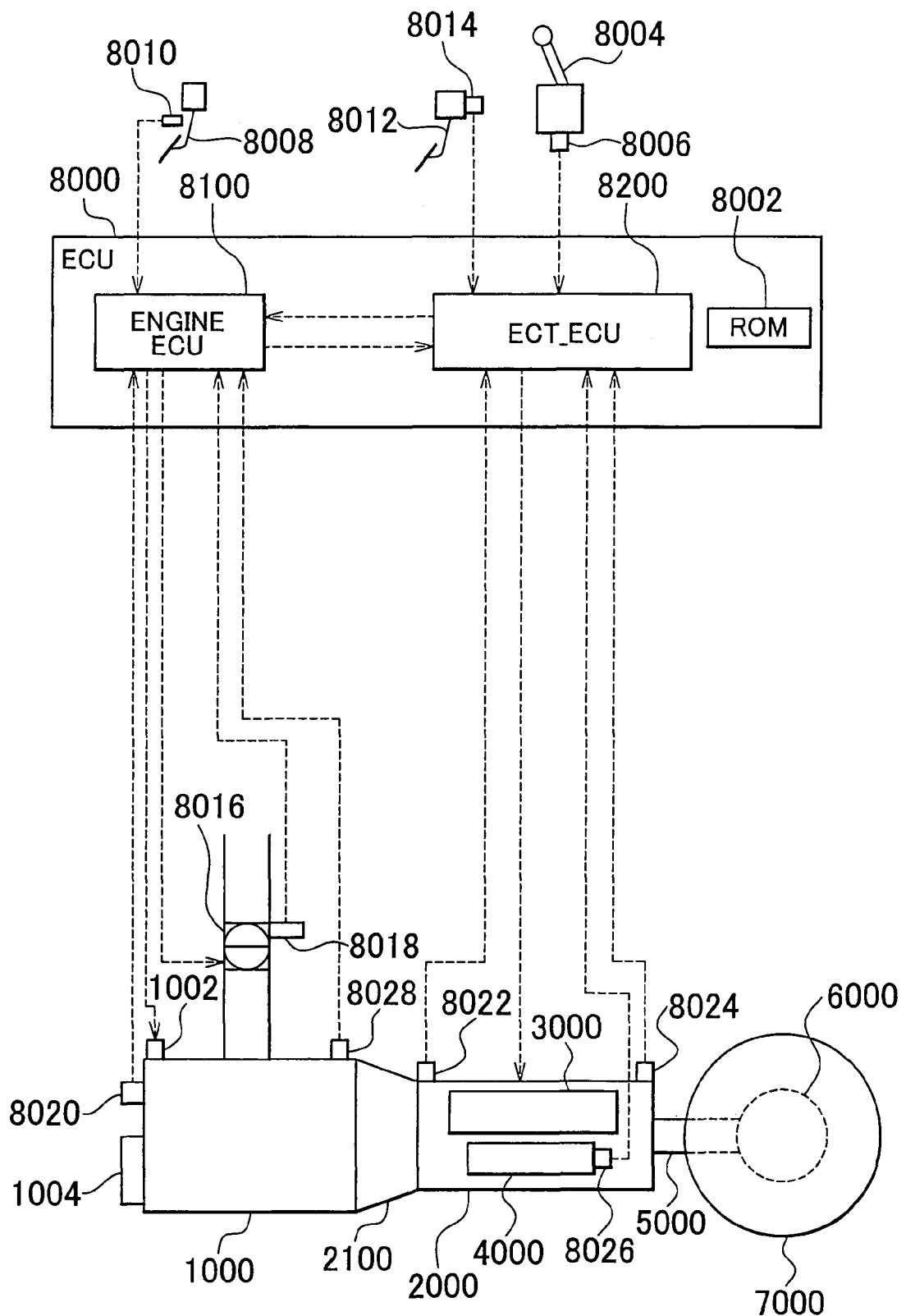
FIG. 1 is a schematic configuration diagram showing a power train of a vehicle.

An embodiment of the present invention will be described below with reference to drawings. In the following description, the same parts are denoted by the same reference numeral. The name and function of these parts are the same. Hence, detailed description of such parts will not be repeated.

Referring to FIG. 1, a vehicle in which a controller according to the embodiment of the present invention is installed will be described. The vehicle is an FR (Front-engine, Rear-drive) vehicle. The vehicle may be a vehicle that is not an FR vehicle.

The vehicle includes: an engine 1000; an automatic transmission 2000; a torque converter 2100; a planetary gear unit 3000 constituting part of the automatic transmission 2000; a hydraulic circuit 4000 constituting part of the automatic transmission 2000; a propeller shaft 5000; a differential gear 6000; rear wheels 7000; and an ECU (Electronic Control Unit) 8000.

In this embodiment, a power train includes the engine 1000 and the automatic transmission 2000. The controller according to the embodiment is implemented by executing a program stored in a ROM (Rear Only Memory) 8002 of the ECU 8000, for example.

The engine 1000 is an internal combustion engine in which an air-fuel mixture injected through an injector 1002 is burned in a combustion chamber in a cylinder. The combustion causes a piston in the cylinder to be pushed downward, so that a crankshaft is rotated. The driving power output from the engine 1000 drives an auxiliary 1004, such as an alternator and an air conditioner. Instead of or in addition to the engine 1000, a motor may be used as a motive power source.

The automatic transmission 2000 is connected to the engine 1000 through the torque converter 2100. The automatic transmission 2000 changes the rotation speed of the crankshaft to obtain a desired rotation speed by establishing a desired gear.

The driving power output from the automatic transmission 2000 is transmitted to the right and left rear wheels 7000 through the propeller shaft 5000 and the differential gear 6000.

Connected to the ECU 8000 through a harness and others are: a position switch 8006 of a shift lever 8004; an accelerator pedal operation amount sensor 8010 of an accelerator pedal 8008; a pedal depression force sensor 8014 of a brake pedal 8012; throttle opening amount sensors 8018 of electronic throttle valves 8016; an engine speed sensor 8020; an input shaft-rotation speed sensor 8022; an output shaft-rotation speed sensor 8024; an oil temperature sensor 8026; and a water temperature sensor 8028.

The position of the shift lever 8004 is detected by the position switch 8006, and a signal indicating the result of the detection is transmitted to the ECU 8000. A gear of the automatic transmission 2000 is automatically established according to the position of the shift lever 8004. The power train may be configured so that a manual shift mode, in which a driver can select an arbitrary gear, can be selected according to operation by the driver.

The accelerator pedal operation amount sensor 8010 detects the operation amount of the accelerator pedal 8008, and transmits the signal indicating the result of the detection to the ECU 8000. The pedal depression force sensor 8014 detects the depression force exerted on the brake pedal 8012 (the force by which a driver depresses the brake pedal 8012), and transmits the signal indicating the result of the detection to the ECU 8000.

The throttle opening amount sensor 8018 detects the opening amount of the electronic throttle valves 8016 whose opening amount is adjusted by actuators, and then transmits the signal indicating the result of the detection to the ECU 8000. The electronic throttle valves 8016 regulate the amount of air taken into the engine 1000 (the power of the engine 1000).

The amount of air taken into the engine 1000 may be regulated by changing the lift amount of intake and exhaust valves (not shown) and/or the phase at which the intake valves and/or exhaust valves are opened/closed, instead of or in addition to controlling the electronic throttle valve 8016.

The engine speed sensor 8020 detects the rotation speed of the output shaft (crankshaft) of the engine 1000, and transmits the signal indicating the result of the detection to the ECU 8000. The input shaft-rotation speed sensor 8022 detects the rotation speed NI of the input shaft of the automatic transmission 2000 (the rotation speed NT of the turbine of the torque converter 2100), and transmits the signal indicating the result of the detection to the ECU 8000. The output shaft-rotation speed sensor 8024 detects the output shaft rotation speed NO of the automatic transmission 2000, and transmits the signal indicating the result of the detection to the ECU 8000.

The oil temperature sensor 8026 detects the temperature (oil temperature) of the oil (ATF: Automatic Transmission Fluid) used to operate and lubricate the automatic transmission 2000, and transmits the signal indicating the result of the detection to the ECU 8000.

The water temperature sensor 8028 detects the temperature (water temperature) of the coolant of the engine 1000, and transmits the signal indicating the result of the detection to the ECU 8000.

The ECU 8000 controls instruments based on the signals transmitted from the position switch 8006, the accelerator pedal operation amount sensor 8010, the pedal depression force sensor 8014, the throttle opening amount sensors 8018, the engine speed sensor 8020, the input shaft-rotation speed sensor 8022, the output shaft-rotation speed sensor 8024, the oil temperature sensor 8026, and the water temperature sensor 8028, and using the maps and programs stored in the ROM 8002 so that the vehicle is brought into a desired driving status.

In this embodiment, when the drive (D) range is selected as the shift range in the automatic transmission 2000 by positioning the shift lever 8004 at the drive (D) position, the ECU 8000 controls the automatic transmission 2000 so that one of the forward first to eighth gears is established. When one of the forward first to eighth gears is established, the automatic transmission 2000 transmits driving force to the rear wheels 7000. The automatic transmission 2000 may be configured so as to be able to establish a gear higher than the eighth gear in the D range. The gear to be established is determined based on the shift diagram previously prepared through, for example, experiments using the vehicle speed and the accelerator pedal operation amount as parameters.

As shown in FIG. 1, the ECU 8000 includes an engine ECU 8100 for controlling the engine 1000, and an ECT (Electronic Controlled Transmission)-ECU 8200 for controlling the automatic transmission 2000.

The engine ECU 8100 and the ECT-ECU 8200 are configured so as to be able to transmit and receive signals to and from each other. In this embodiment, the engine ECU 8100 transmits a signal indicating the accelerator pedal operation amount to the ECT-ECU 8200. The ECT-ECU 8200 transmits a signal indicating the value of requested torque that is the torque the engine 1000 should output.

Figure 2:
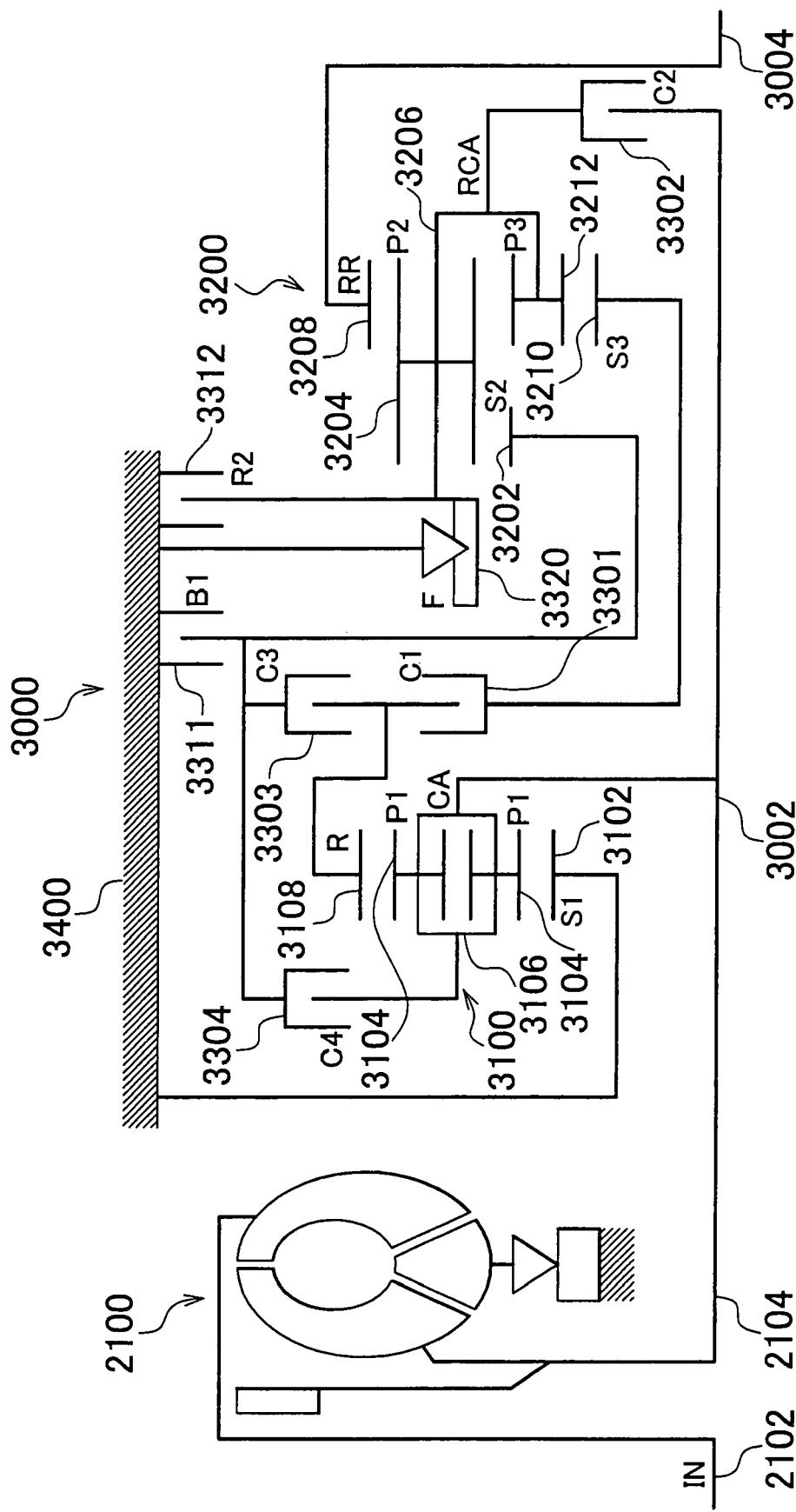
FIG. 2 is a skeleton diagram showing a planetary gear unit of an automatic transmission.

The planetary gear unit 3000 will be described with reference to FIG. 2. The planetary gear unit 3000 is connected to the torque converter 2100 that has an input shaft 2102 connected to the crankshaft.

The planetary gear unit 3000 includes a front planetary gear 3100, a rear planetary gear 3200, a C1 clutch 3301, a C2 clutch 3302, a C3 clutch 3303, a C4 clutch 3304, a B1 brake 3311, a B2 brake 3312, and a one-way clutch (F) 3320.

The front planetary gear 3100 is a double-pinion planetary gear mechanism. The front planetary gear 3100 includes a first sun gear (S1) 3102, a pair of first pinions (P1) 3104, a carrier (CA) 3106, and a ring gear (R) 3108.

The first pinion (P1) 3104 is in mesh with the first sun gear (S1) 3102 and the first ring gear (R) 3108. The first carrier (CA) 3106 supports the first pinions (P1) 3104 so that the first pinions (P1) 3104 can revolve and rotate.

The first sun gear (S1) 3102 is unrotatably fixed to a gear case 3400. The first carrier (CA) 3106 is connected to the input shaft 3002 of the planetary gear unit 3000.

The rear planetary gear 3200 is a Ravigneaux type planetary gear mechanism. The rear planetary gear 3200 includes a second sun gear (S2) 3202, a second pinion (P2) 3204, a rear carrier (RCA) 3206, a rear ring gear (RR) 3208, a third sun gear (S3) 3210, and a third pinion (P3) 3212.

The second pinion (P2) 3204 is in mesh with the second sun gear (S2) 3202, the rear ring gear (RR) 3208, and the third pinion (P3) 3212. The third pinion (P3) 3212 is in mesh with the third sun gear (S3) 3210 in addition to the second pinion (P2) 3204.

The rear carrier (RCA) 3206 supports the second pinion (P2) 3204 and the third pinion (P3) 3212 so that the second pinion (P2) 3204 and the third pinion (P3) 3212 can revolve and rotate. The rear carrier (RCA) 3206 is connected to the one-way clutch (F) 3320. The rear carrier (RCA) 3206 is unrotatable when the vehicle is driven in first gear (that is, when the vehicle is running using the driving power output from the engine 1000 in first gear). The rear ring gear (RR) 3208 is connected to the output shaft 3004 of the planetary gear unit 3000.

The one-way clutch (F) 3320 is provided in parallel with the B2 brake 3312. Specifically, an outer race of the one-way clutch (F) 3320 is fixed to the gear case 3400, and an inner race thereof is connected to the rear carrier (RCA) 3206.

FIG. 3 shows an operational table showing the relations between gears and the operational status of the clutches and the brakes. The forward first to eighth gear and the reverse first and second gear are established by operating the brakes and clutches according to the combination shown in this operational table.

A main portion of the hydraulic circuit 4000 will be described with reference to FIG. 4. It should be noted that the hydraulic circuit 4000 is not limited to the one described below.

The hydraulic circuit 4000 includes an oil pump 4004, a primary regulator valve 4006, a manual valve 4100, a solenoid modulator valve 4200, an SL1 linear solenoid (hereinafter denoted as SL(1)) 4210, an SL2 linear solenoid (hereinafter referred to as SL(2)) 4220, an SL3 linear solenoid (hereinafter referred to as SL(3)) 4230, an SL4 linear solenoid (hereinafter referred to as SL(4)) 4240, an SL5 linear solenoid (hereinafter referred to as SL(5)) 4250, an SLT linear solenoid (hereinafter referred to as SLT) 4300, and a B2 control valve 4500.

The oil pump 4004 is connected to the crankshaft of the engine 1000. Rotation of the crankshaft drives the oil pump 4004 to produce hydraulic pressure. The hydraulic pressure produced by the oil pump 4004 is regulated by the primary regulator valve 4006 to produce a line pressure.

The primary regulator valve 4006 operates using the throttle pressure regulated by the SLT 4300 as the pilot pressure. The line pressure is supplied to the manual valve 4100 through a line pressure oil passage 4010.

The manual valve 4100 includes a drain port 4105. The hydraulic pressure in a D-range pressure oil passage 4102 and an R-range pressure oil passage 4104 is discharged through the drain port 4105. When the spool in the manual valve 4100 is positioned at the D position, the line pressure oil passage 4010 and the D-range pressure oil passage 4102 are caused to communicate with each other, so that hydraulic pressure is supplied to the D-range pressure oil passage 4102. At this time, the R-range pressure oil passage 4104 and the drain port 4105 are caused to communicate with each other, so that the R-range pressure in the R-range pressure oil passage 4104 is discharged through the drain port 4105.

When the spool of the manual valve 4100 is positioned at the R position, the line pressure oil passage 4010 and the R-range pressure oil passage 4104 are caused to communicate with each other, so that hydraulic pressure is supplied to the R-range pressure oil passage 4104. At this time, the D-range pressure oil passage 4102 and the drain port 4105 are caused to communicate with each other, so that the D-range pressure in the D-range pressure oil passage 4102 is discharged through the drain port 4105.

When the spool of the manual valve 4100 is positioned at the N position, the drain port 4105 is caused to communicate with both the D-range pressure oil passage 4102 and the R-range pressure oil passage 4104, so that the D-range pressure in the D-range pressure oil passage 4102 and the R-range pressure in the R-range pressure oil passage 4104 are discharged through the drain port 4105.

The hydraulic pressure supplied to the D-range pressure oil passage 4102 is ultimately supplied to the C1 clutch 3301, the C2 clutch 3302 and the C3 clutch 3303. The hydraulic pressure supplied to the R-range pressure oil passage 4104 is ultimately supplied to the B2 brake 3312.

The solenoid modulator valve 4200 regulates the hydraulic pressure (solenoid modulator pressure), which is supplied to the SLT 4300, at a certain pressure, using the line pressure as the source pressure.

The SL(1) 4210 regulates the hydraulic pressure supplied to the C1 clutch 3301. The SL(2) 4220 regulates the hydraulic pressure supplied to the C2 clutch 3302. The SL(3) 4230 regulates the hydraulic pressure supplied to the C3 clutch 3303. The SL(4) 4240 regulates the hydraulic pressure supplied to the C4 clutch 3304. The SL(5) 4250 regulates the hydraulic pressure supplied to the B1 brake 3311.

The SLT 4300 regulates the solenoid modulator pressure according to the control signal supplied from the ECU 8000 that is based on the accelerator pedal operation amount detected by the accelerator pedal operation amount sensor 8010, thereby producing the throttle pressure. The throttle pressure is supplied to the primary regulator valve 4006 through an SLT oil passage 4302. The throttle pressure is used as the pilot pressure for the primary regulator valve 4006.

The SL(1) 4210, the SL(2) 4220, the SL(3) 4230, the SL(4) 4240, the SL(5) 4250, and the SLT 4300 are controlled by the control signal transmitted from the ECU 8000.

The B2 control valve 4500 supplies the hydraulic pressure in any one of the D-range pressure oil passage 4102 and the R-range pressure oil passage 4104 selectively to the B2 brake 3312. The D-range pressure oil passage 4102 and the R-range pressure oil passage 4104 are connected to the B2 control valve 4500. The B2 control valve 4500 is controlled using the hydraulic pressure supplied from an SLU solenoid valve (not shown) and the urging force exerted by a spring.

Figure 4:
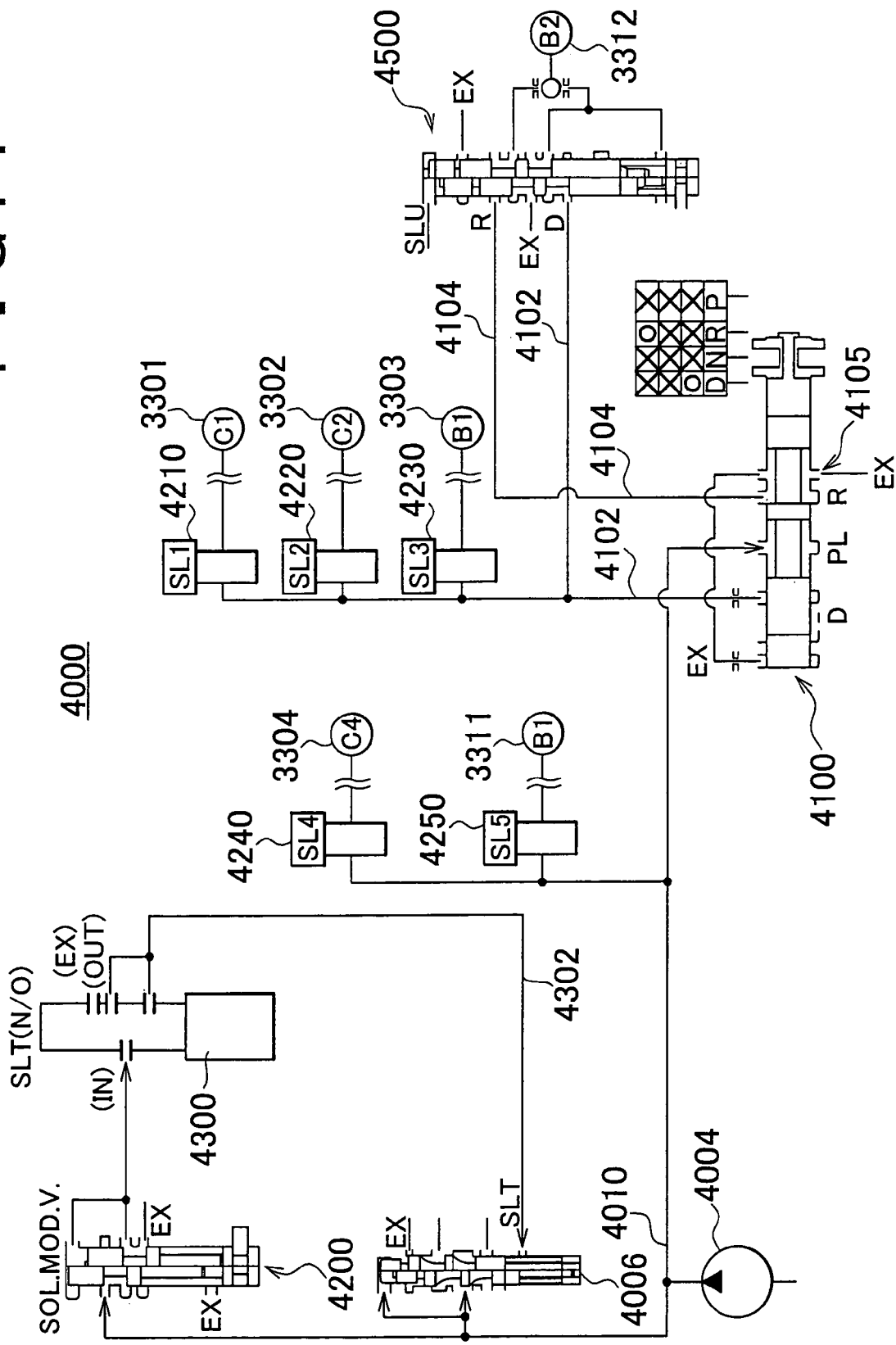
FIG. 4 is a diagram showing a hydraulic circuit of the automatic transmission.

When the SLU solenoid valve is turned on, the B2 control valve 4500 is brought into the state shown on the left side in FIG. 4. In this case, supplied to the B2 brake 3312 is the hydraulic pressure obtained by regulating the D-range pressure using, as the pilot pressure, the hydraulic pressure supplied from the SLU solenoid valve.

When the SLU solenoid valve is turned off, the B2 control valve 4500 is brought into the state shown on the right side in FIG. 4. In this case, the R-range pressure is supplied to the B2 brake 3312.

Figure 5:
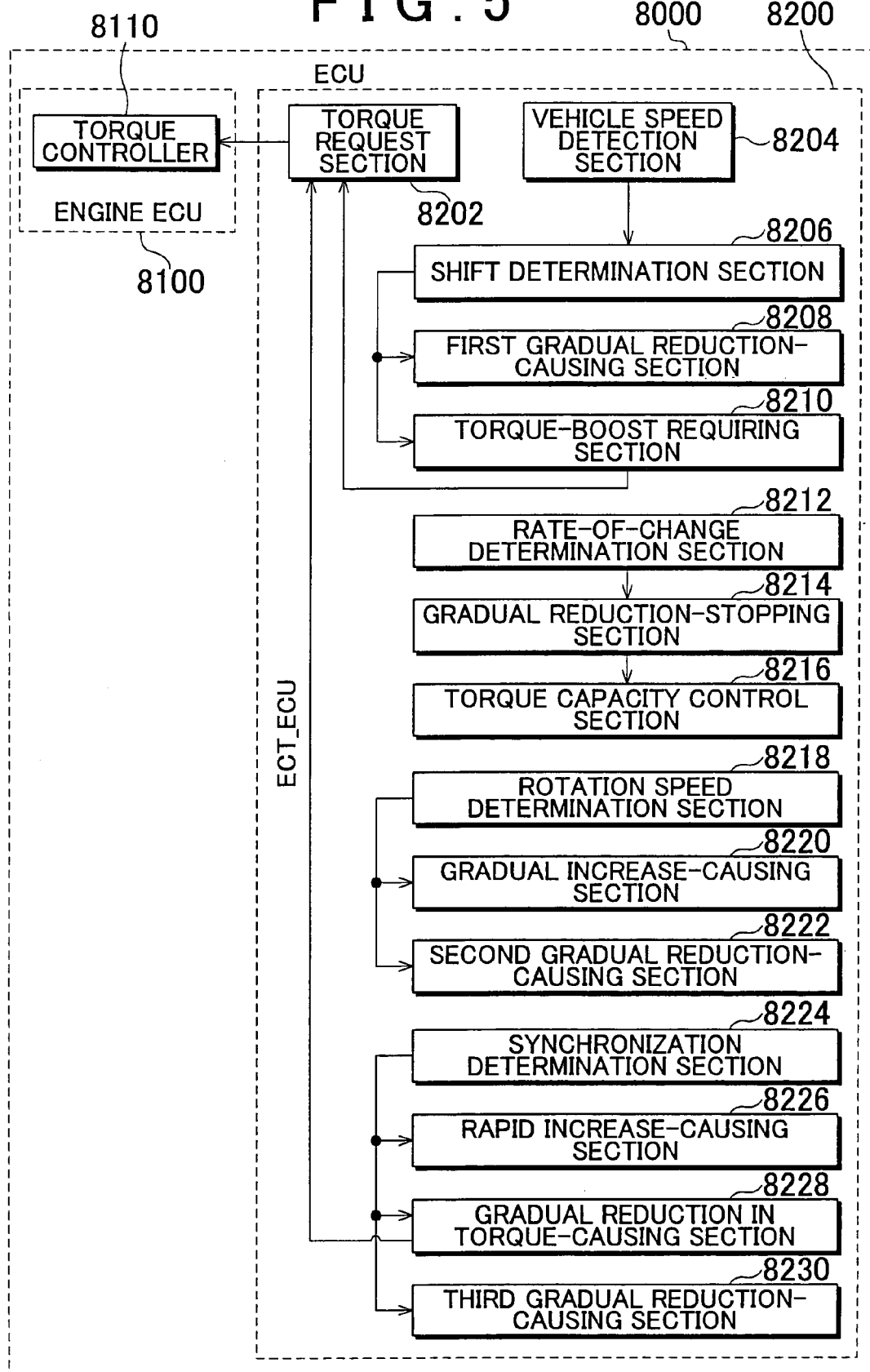
FIG. 5 shows a functional block diagram of an ECU.

The ECU 8000 will be further described with reference to FIG. 5. The functions of the ECU 8000 described below may be implemented either by hardware or by software.

The engine ECU 8100 of the ECU 8000 includes a torque controller 8110. The torque controller 8110 receives the requested torque value output from the ECT-ECU 8200, and controls the amount of opening of the electronic throttle valve 8016 and the ignition timing of the ignition plugs so that the torque corresponding to the requested torque value is output from the engine 1000.

The ECT_ECU 8200 of the ECU 8000 includes a torque request section 8202, a vehicle speed detection section 8204, a shift determination section 8206, a first gradual reduction-causing section 8208, a torque-boost requiring section 8210, a rate-of-change determination section 8212, a gradual reduction-stopping section 8214, a torque capacity control section 8216, a rotation speed determination section 8218, a gradual increase-causing section 8220, a second gradual reduction-causing section 8222, a synchronization determination section 8224, a rapid increase-causing section 8226, a gradual reduction in torque-causing section 8228, and a third gradual reduction-causing section 8230.

The torque request section 8202 sets the requested torque value, which is the amount of torque the engine 1000 is required to produce, based on the accelerator pedal operation amount or the like.

The vehicle speed detection section 8204 calculates (detects) vehicle speed from the rotation speed NO of the output shaft of the automatic transmission 2000.

Figure 6:
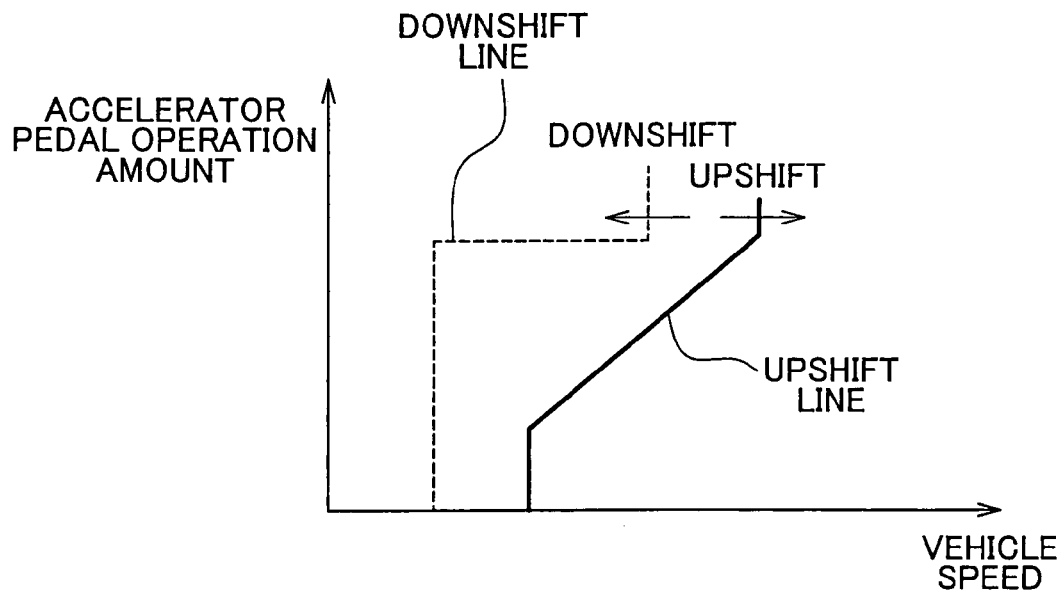
FIG. 6 shows a shift diagram.

The shift determination section 8206 determines whether to perform one of an upshift and a downshift according to the shift diagram in which the vehicle speed and the accelerator pedal operation amount are used as parameters, as shown in FIG. 6. In the shift diagram, an upshift line and a downshift line are set for each kind of shift (the combination of gears before and after a shift).

When it is determined that a downshift should be performed, the first gradual reduction-causing section 8208 performs control so that the torque capacity Tch (the torque that can be transmitted by a frictional engagement device) of the frictional engagement device that is brought from an engaged state into a disengaged state by a downshift operation is reduced.

Figure 7:
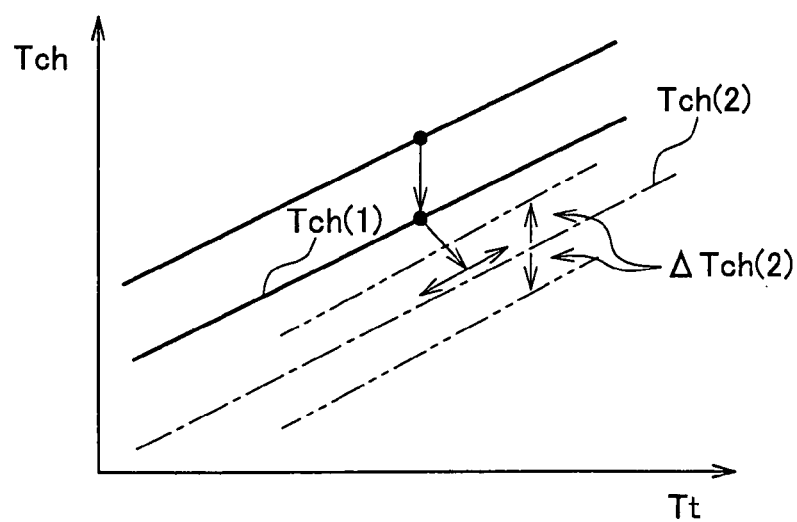
FIG. 7 is a diagram showing relations between input torque Tt and torque capacity Tch of the automatic transmission.

For example, as shown in FIG. 7, control is performed so that, first, the torque capacity Tch is rapidly reduced to a predetermined value Tch(1), and second, after a predetermined time has elapsed, the torque capacity Tch is gradually reduced (reduced at a predetermined reduction rate) to start an inertia phase. The Tch(2) in FIG. 7 indicates the torque capacity Tch after the gradual reduction.

When it is determined that a downshift should be performed, the torque boost-requiring section 8210 sets the amount of torque boost corresponding to the torque that the engine 1000 is required to produce in addition to the torque corresponding to the requested torque value determined from the accelerator pedal operation amount or the like. That is, torque that the engine 1000 is required to produce is raised by the set torque boost amount.

The rate-of-change determination section 8212 determines whether the rate of change in the input shaft rotation speed NI of the automatic transmission 2000 in the inertia phase has reached a predetermined desired rate of change ΔN(1).

When the rate of change in the input shaft rotation speed NI of the automatic transmission 2000 in the inertia phase has reached the desired rate of change ΔN(1), the gradual reduction-stopping section 8214 stops gradual reduction of the torque capacity Tch of the frictional engagement device that is brought from an engaged state into a disengaged state by the downshift operation.

After the gradual reduction of the torque capacity Tch of the frictional engagement device is stopped, the torque capacity control section 8216 controls the torque capacity Tch of the frictional engagement device that is brought from an engaged state into a disengaged state by the downshift operation, in accordance with a predetermined map, depending on the input torque Tt supplied to the automatic transmission 2000 as shown by the chain line in FIG. 7.

In addition, as shown by the chain double-dashed line in FIG. 7, the torque capacity control section 8216 controls the torque capacity Tch so as to maintain, at the desired rate of change ΔN(1), the rate of change in the input shaft rotation speed NI of the automatic transmission 2000 in the inertia phase.

When the rate of change in the input shaft rotation speed NI of the automatic transmission 2000 becomes greater than the desired rate of change ΔN(1), for example, the torque capacity Tch is increased. When the rate of change in the input shaft rotation speed NI of the automatic transmission 2000 becomes less than the desired rate of change ΔN(1), the torque capacity Tch is reduced. The ΔTch(2) in FIG. 7 is the amount by which the torque capacity Tch is adjusted to maintain the rate of change in the input shaft rotation speed NI at the desired rate of change ΔN(1).

With regard to the method of calculating the input torque Tt supplied to the automatic transmission 2000, it suffices to use well-known, common techniques. Thus, detailed description thereof is not repeated herein. The output torque from the engine 1000 may be used instead of the input torque supplied to the automatic transmission 2000.

The rotation speed determination section 8218 determines whether the input shaft rotation speed NI of the automatic transmission 2000 has become higher than a synchronized rotation speed with respect to the gear established after the downshift within a predetermined range in the inertia phase. A synchronized rotation speed is a speed at which the input shaft of the automatic transmission rotates when the vehicle is running in the gear that is established after a downshift.

In this description of the embodiment, "when the input shaft rotation speed NI is higher than a synchronized rotation speed within the predetermined range" means "the input shaft rotation speed NI is higher than a synchronized rotation speed, and is equal to or lower than the sum of the synchronized rotation speed and a threshold value A(1)." The threshold value A(1) is a positive value.

When, in the inertia phase, the input shaft rotation speed NI of the automatic transmission 2000 becomes higher than a synchronized rotation speed with respect to the gear established after the downshift within a predetermined range, the gradual increase-causing section 8220 performs control so that the torque capacity Tcl of the frictional engagement device that is brought from a disengaged state into an engaged state by the downshift operation is gradually increased (increased at a predetermined increasing rate). For example, the torque capacity Tcl of the frictional engagement device that is brought from a disengaged state into an engaged state by the downshift operation is increased by a predetermined value every control cycle.

When, in the inertia phase, the input shaft rotation speed NI of the automatic transmission 2000 becomes higher than a synchronized rotation speed with respect to the gear established after the downshift within a predetermined range, the second gradual reduction-causing section 8222 gradually reduces the torque capacity Tch of the frictional engagement device that is brought from an engaged state into a disengaged state by the downshift operation so that the torque capacity Tch becomes equal to the value determined using the following equation (1).

$$Tch = k(1) \times Tt - k(2) \times Tcl \tag{1}$$

where "k(1)" and "k(2)" in the equation (1) are constants that are determined depending on gear trains.

The output torque To from the automatic transmission 2000 during the inertia phase of a downshift is calculated by the following equation (2).

$$To = k(3) \times Tch + k(4) \times Tcl \tag{2}$$

where "k(3)" and "k(4)" are constants that are determined depending on gear trains.

The output torque To from the automatic transmission 2000 during the torque phase of a downshift is calculated by the following equation (3).

$$To = k(5) \times Tt - k(6) \times Tch \quad (3)$$

where "k(5)" and "k(6)" are constants that are determined depending on gear trains.

Assuming that the output torque To of the equation (2) equals to the output torque To of the equation (3), the following equation (4) is obtained.

$$k(3) \times Tch + k(4) \times Tcl = k(5) \times Tt - k(6) \times Tch \quad (4)$$

The above equation (1) is obtained by transforming the equation (4).

The torque capacity Tch of the frictional engagement device that is brought from an engaged state into a disengaged state by the downshift operation is gradually reduced, and the torque capacity Tcl of the frictional engagement device that is brought from a disengaged state into an engaged state is gradually increased, while maintaining a relation between the torque capacities Tch and Tcl such that the output torque To from the automatic transmission 2000 at the end of an inertia phase and the output torque To therefrom at the start of the subsequent torque phase are equalized to each other.

Figure 8:
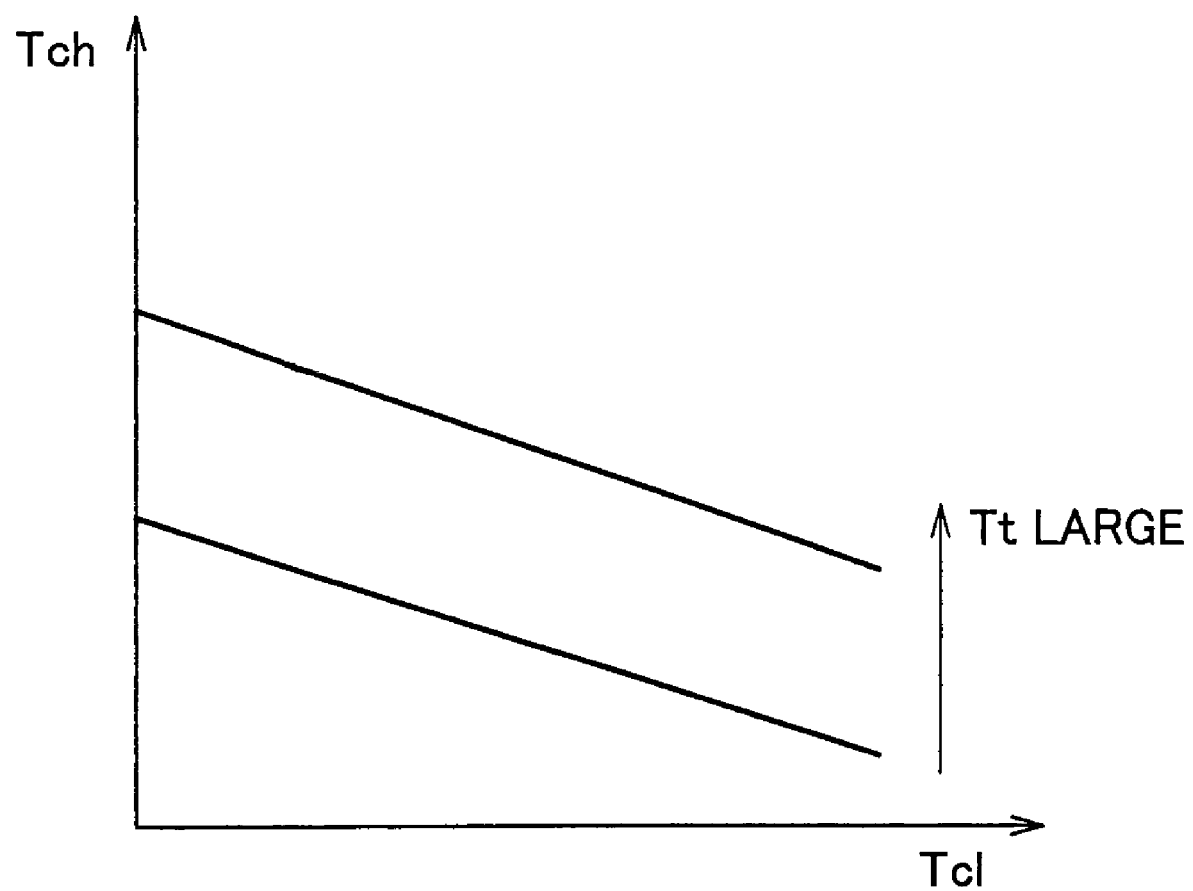
FIG. 8 is a diagram showing relations between torque capacity Tcl and torque capacity Tch.

As a result, the torque capacity Tcl of the frictional engagement device that is brought from a disengaged state into an engaged state by the downshift operation, and the torque capacity Tch of the frictional engagement device that is brought from an engaged state into a disengaged state by the downshift operation, vary in accordance with the relation as shown in FIG. 8.

The synchronization determination section 8224 determines whether the input shaft rotation speed NI of the automatic transmission 2000 and the synchronized rotation speed with respect to the gear established after the downshift have been equalized to each other. For example, when the difference between the input shaft rotation speed NI and the synchronized rotation speed becomes equal to or less than a threshold value A(2), it is determined that the input shaft rotation speed NI and the synchronized rotation speed have been equalized to each other. It should be noted that the threshold value A(2) is a positive value, and is less than the threshold value A(1).

When it is determined that the input shaft rotation speed NI and the synchronized rotation speed have been equalized to each other, the rapid increase-causing section 8226 performs control so that the torque capacity Tcl of the frictional engagement device that is brought from a disengaged state into an engaged state by the downshift operation is rapidly increased.

When it is determined that the input shaft rotation speed NI and the synchronized rotation speed have been equalized to each other, the gradual reduction in torque-causing section 8228 gradually reduces the torque boost amount (starts to gradually reduce the torque boost amount). That is, torque that the engine 1000 is required to produce is gradually reduced.

When it is determined that the input shaft rotation speed NI and the synchronized rotation speed have been equalized to each other, the third gradual reduction-causing section 8230 gradually reduces the torque capacity Tch of the frictional engagement device that is brought from an engaged state into a disengaged state by the downshift operation so that the start and end of the gradual reduction of the torque capacity Tch are synchronized with the start and end of the gradual reduction of the torque boost amount (the output torque from the engine).

Specifically, the gradual reduction of the amount of boost of the torque from the engine 1000 and the reduction of the torque capacity Tch in the torque phase of the downshift are started synchronously (at the same time). Similarly, the gradual reduction of the amount of boost of the torque from the engine 1000 and the reduction of the torque capacity Tch in the torque phase of the downshift are finished synchronously (at the same time).

Figure 9A:
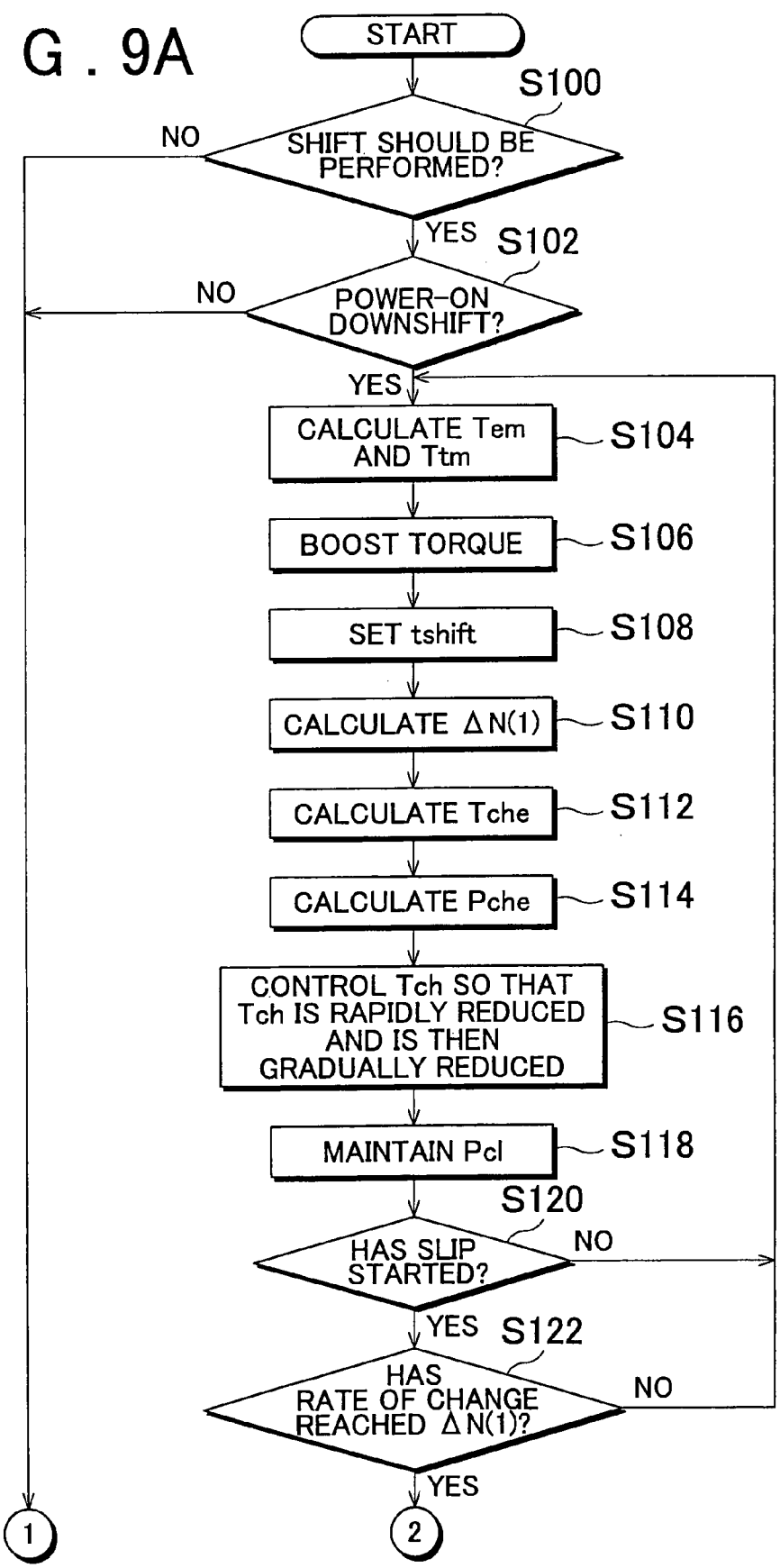
FIGS. 9A, 9B is a flow chart showing a control flow of a program executed by the ECU.
Figure 9B:
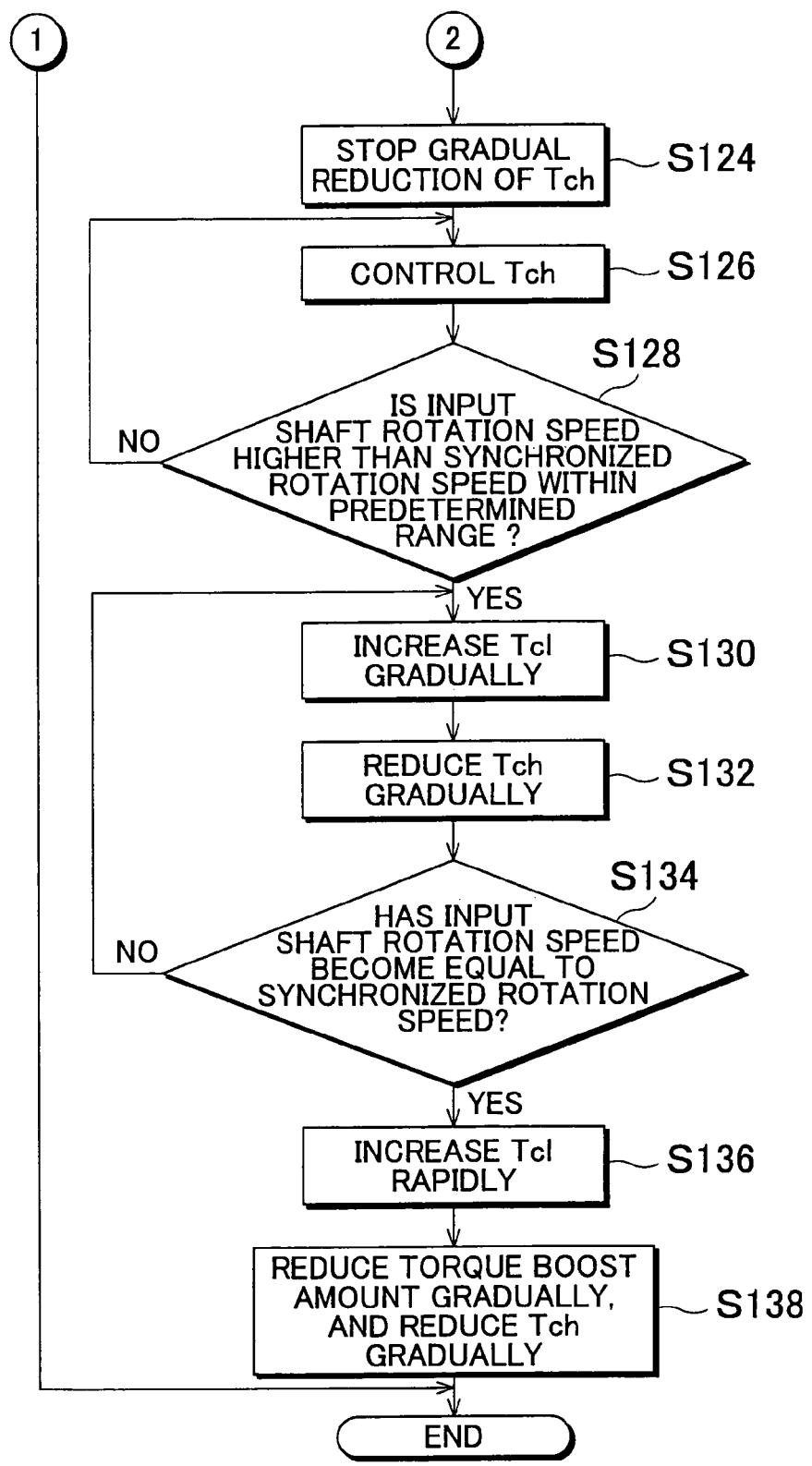

A control flow of a program executed by the ECU 8000, which functions as the controller according to this embodiment will be described with reference to FIGS. 9A, 9B. The program described below is repeatedly executed in a predetermined cycle.

In step (hereinafter, "step" is abbreviated as "S") 100, the ECU 8000 determines whether it is determined that a shift should be performed. When it is determined that a shift should be performed (YES in S100), the process proceeds to S102. If not (NO in S100), the process ends.

In S102, the ECU 8000 determines whether to perform a power-on downshift (a downshift caused by increasing the accelerator pedal operation amount). When the power-on downshift is performed (YES in S102), the process proceeds to S104. If not (NO in S102), the process ends.

In S104, the ECU 8000 calculates the maximum output torque Tem that the engine 1000 can produce at present engine speed Ne, and the corresponding turbine torque Ttm. The maximum output torque Tem means the output torque that is output when the throttle is fully opened. The turbine torque Ttm is calculated from the output torque Tem of the engine 1000. With regard to the method of calculating the turbine torque Ttm, it suffices to use a well-known, common method. Thus, detailed description thereof is not repeated herein. In S106, the ECU 8000 boosts the torque from the engine 1000.

In S108, the ECU 8000 sets a desired shift time tshift in the inertia phase. The desired shift time tshift is set according to a map whose parameters are the kind of shift (the combination of gears before and after a shift), the vehicle speed, etc. It should be noted that the method of setting the desired shift time tshift is not limited to the above method.

In S110, the ECU 8000 calculates the desired rate of change ΔN(1). The desired rate of change ΔN(1) is calculated from the following equation (5).

$$\Delta N(1) = (N(2) - N(1))/tshift \quad (5)$$

In the equation (5), "N(2)" is the input shaft rotation speed NI (synchronized rotation speed) of the automatic transmission 2000 at which the input shaft rotates when the gear to be established after a shift (after a downshift) is established. "N(1)" is the input shaft rotation speed NI at which the input shaft rotates in the gear before the shift.

In S112, the ECU 8000 calculates the estimation value Tche of the torque capacity Tch of the frictional engagement device that is brought from an engaged state into a disengaged state by the downshift operation. The estimation value Tche is calculated using the following equation (6).

$$Tche = (Ttm - I \times \Delta N(1))/k(7) \quad (6)$$

In the equation (6), "I" is a constant representing the inertia of the input system of the automatic transmission 2000, and "k(7)" is a constant that is determined depending on gear trains.

In S114, the ECU 8000 calculates the estimation value Pche of the hydraulic pressure supplied to the frictional engagement device that is brought from an engaged state into a disengaged state by the downshift operation. The estimation value Pche is calculated using the following equation (7).

$$Pche = (Tche/\mu/r + W) \quad (7)$$

In the equation (7), "$\mu$" is the coefficient of friction of the piston of the frictional engagement device, "r" is the radius of the piston of the frictional engagement device, and "W" is the return force exerted after the piston has been displaced.

In S116, the ECU 8000 performs control so that, first, the torque capacity Tch of the frictional engagement device that is brought from an engaged state into a disengaged state by the downshift operation is rapidly reduced to the predetermined value Tch(1), and second, after a predetermined time has elapsed, the torque capacity Tch is gradually reduced to start an inertia phase, as shown in FIG. 7.

Referring back to FIGS. 9A, 9B, in S118, the ECU 8000 maintains the hydraulic pressure Pcl supplied to the frictional engagement device that is brought from a disengaged state into an engaged state by the downshift operation at such a pressure that causes no torque capacity to occur.

In S120, the ECU 8000 determines whether a slip in the frictional engagement device that is brought from an engaged state into a disengaged state by the downshift operation has started. Whether a slip in the frictional engagement device has started is determined based on whether the input shaft rotation speed NI of the automatic transmission 2000 has started to vary, for example. When a slip in the frictional engagement device has started (YES in S120), the process proceeds to S122. If not (NO in S120), the process returns to S104.

In S122, the ECU 8000 determines whether the rate of change in the input shaft rotation speed NI of the automatic transmission 2000 has reached the desired rate of change $\Delta N(\mathbf{1})$. When the rate of change in the input shaft rotation speed NI has reached the desired rate of change $\Delta N(\mathbf{1})$ (YES in S122), the process proceeds to S124. If not (NO in S122), the process returns to S104.

In S124, the ECU 8000 stops the gradual reduction of the torque capacity Tch of the frictional engagement device that is brought from an engaged state into a disengaged state by the downshift operation.

In S126, the ECU 8000 controls, in accordance with the input torque Tt supplied to the automatic transmission 2000, the torque capacity Tch of the frictional engagement device that is brought from an engaged state into a disengaged state by the downshift operation. At the same time, the ECU 8000 controls the torque capacity Tch so that the rate of change in the input shaft rotation speed NI is maintained at the desired rate of change $\Delta N(\mathbf{1})$.

In S128, the ECU 8000 determines whether the input shaft rotation speed NI of the automatic transmission 2000 has become higher than a synchronized rotation speed with respect to the gear established after the downshift within a predetermined range in the inertia phase. When the input shaft rotation speed NI becomes higher than the synchronized rotation speed within the predetermined range (YES in S128), the process proceeds to S130. If not (NO in S128), the process proceeds to S126.

In S130, the ECU 8000 performs control so that the torque capacity Tcl of the frictional engagement device that is brought from a disengaged state into an engaged state by the downshift operation is gradually increased. For example, the torque capacity Tcl of the frictional engagement device that is brought from a disengaged state into an engaged state by the downshift operation is increased by a predetermined value every predetermined period of time.

In S132, the ECU 8000 gradually reduces the torque capacity Tch of the frictional engagement device that is brought from an engaged state into a disengaged state by the downshift operation to the torque capacity Tch determined using the above equation (1).

In S134, the ECU 8000 determines whether the input shaft rotation speed NI of the automatic transmission 2000 and the synchronized rotation speed with respect to the gear established after the downshift have become equal to each other. When the input shaft rotation speed NI and the synchronized rotation speed become equal to each other (YES in S134), the process proceeds to S136. If not (NO in S134), the process returns to S130.

In S136, the ECU 8000 performs control so that the torque capacity Tcl of the frictional engagement device that is brought from a disengaged state into an engaged state by the downshift operation is rapidly increased.

In S138, the ECU 8000 gradually reduces the amount of boost of the torque from the engine 1000 (that is, starts to gradually reduce the torque boost amount), and gradually reduces the torque capacity Tch of the frictional engagement device that is brought from an engaged state into a disengaged state by the downshift operation with the start and end of the reduction synchronized.

Figure 10:
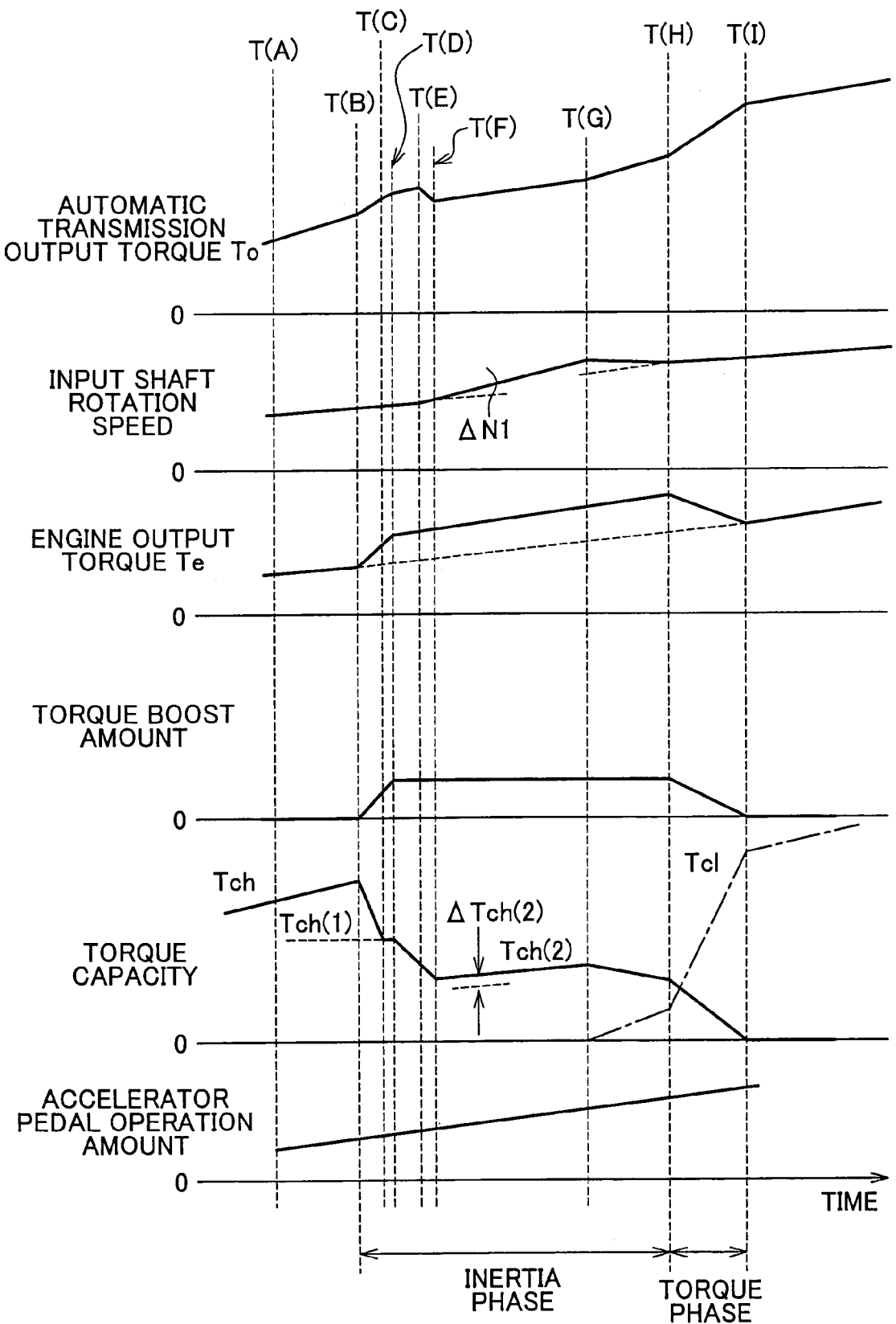
FIG. 10 is a timing chart showing transitions of torque capacity, etc.

Operation of the ECU 8000, which functions as the controller according to this embodiment, based on the above-described configuration and flow chart, will be described. It is assumed that, because the accelerator pedal operation amount is increased after time T(A) when the vehicle is running, it is determined at time T(B) that a shift should be performed (YES in S100), as shown in FIG. 10. When the accelerator pedal operation amount is increased, and it is therefore determined that a shift should be performed, a power-on downshift is performed (YES in S102).

In this case, the maximum output torque Tem that the engine 1000 can produce at present engine speed Ne and the corresponding turbine torque Ttm are calculated (S104). In addition, the torque from the engine 1000 is boosted (S106).

Moreover, the desired shift time tshift in the inertia phase is set (S108). The desired rate of change $\Delta N(\mathbf{1})$ is calculated using the equation (5) in which the desired shift time is used (S110).

The estimation value Tche of the torque capacity Tch of the frictional engagement device that is brought from an engaged state into a disengaged state by the downshift operation is calculated using the equation (6) in which the desired rate of change $\Delta N(\mathbf{1})$ is used (S112). The estimation value Pche of the hydraulic pressure that is supplied to the frictional engagement device that is brought from an engaged state into a disengaged state by the downshift operation is calculated using the equation (7) in which the estimation value Tche is used (S114).

Control is performed to start an inertia phase as follows: upon boosting the torque from the engine 1000, the torque capacity Tch of the frictional engagement device that is brought from an engaged state into a disengaged state by the downshift operation is rapidly reduced to the predetermined value Tch(1); and then, after a predetermined period of time (time period from T(C) to T(D) in FIG. 10) has elapsed, the torque capacity Tch is gradually reduced (S116). The hydraulic pressure Pcl supplied to the frictional engagement device that is brought from a disengaged state into an engaged state by the downshift operation is maintained at such a pressure that causes no torque capacity to occur (S118).

When a slip between the frictional engagement device that is brought from an engaged state into a disengaged state by the downshift operation starts at time T(E) in FIG. 10 (YES in S120), it is determined whether the rate of change in the input shaft rotation speed NI of the automatic transmission 2000 has reached the desired rate of change ΔN(1) (S122).

When the rate of change in the input shaft rotation speed NI has reached the desired rate of change ΔN(1) at time T(F) in FIG. 10 (YES in S122), the gradual reduction of the torque capacity Tch of the frictional engagement device that is brought from an engaged state into a disengaged state by the downshift operation is stopped (S124).

In this way, it is possible to prevent the torque capacity Tch of the frictional engagement device from being unnecessarily reduced. Thus, it is possible to substantially prevent the output torque from the automatic transmission 2000 from being reduced during the inertia phase. As a result, it becomes possible to keep small the variation in output torque during the transition from an inertia phase to a torque phase.

After the gradual reduction is stopped, the torque capacity Tch of the frictional engagement device is controlled according to the input torque Tt supplied to the automatic transmission 2000, and is controlled so that the rate of change in the input shaft rotation speed NI is maintained at the desired rate of change ΔN(1) (S126).

When the shift operation progresses, and the input shaft rotation speed NI of the automatic transmission 2000 has become higher than the synchronized rotation speed within the predetermined range at time T(G) in FIG. 10 in the inertia phase (YES in S128), the torque capacity Tcl of the frictional engagement device that is brought from a disengaged state into an engaged state by the downshift operation is gradually increased (S130).

At the same time, the torque capacity Tch of the frictional engagement device that is brought from an engaged state into a disengaged state by the downshift operation is gradually reduced to the torque capacity Tch determined using the above equation (1) (S132).

Specifically, the torque capacity Tch of the frictional engagement device that is brought from an engaged state into a disengaged state by the downshift operation is gradually reduced, and the torque capacity Tcl of the frictional engagement device that is brought from a disengaged state into an engaged state is gradually increased, while maintaining a relation between the torque capacities Tch and Tcl such that the output torque To from the automatic transmission 2000 at the end of an inertia phase and the output torque To therefrom at the start of the subsequent torque phase are equalized to each other.

In this way, the curves of the output torque To from the automatic transmission 2000 are smoothly connected at the point of the transition from an inertia phase to a torque phase. Thus, it is possible to keep small the variation in the output torque To during transition from an inertia phase to a torque phase.

When the input shaft rotation speed NI of the automatic transmission 2000 is equalized to the synchronized rotation speed at time T(H) in FIG. 10 (YES in S134), control is performed so that the torque capacity Tcl of the frictional engagement device that is brought from a disengaged state into an engaged state by the downshift operation is rapidly increased (S136).

In addition, the amount of boost of the torque from the engine 1000 is gradually reduced (that is, gradual reduction of the torque boost amount is started), and the torque capacity Tch of the frictional engagement device that is brought from an engaged state into a disengaged state by the downshift operation is gradually reduced with the start and end of the reduction of the torque boost amount and the torque capacity in the torque phase synchronized (S138).

That is, the torque boost amount and the torque capacity Tch are gradually reduced so that the start time thereof is synchronized at time T(H) in FIG. 10, and the end time thereof is synchronized at time T(I).

Thus, it is possible to prevent the torque capacity Tch of the frictional engagement device from becoming excessive or insufficient in relation to the output torque Te from the engine 1000, that is, the input torque Tt supplied to the automatic transmission 2000, during the torque phase. Thus, it is possible to keep small the variation in the output torque from the automatic transmission 2000.

In addition, in a state where the input shaft rotation speed NI is higher than the synchronized rotation speed within a predetermined range, the torque capacity Tch of the frictional engagement device that is brought from an engaged state into a disengaged state by the downshift operation is gradually reduced, and the torque capacity Tcl of the frictional engagement device that is brought from a disengaged state into an engaged state by the downshift operation is gradually increased, whereby the input shaft rotation speed NI is reduced to the synchronized rotation speed.

Reduction of the input shaft rotation speed NI is controlled more easily than increase thereof. Thus, it is possible to keep small the variation in the output torque To from the automatic transmission 2000 during a shift by smoothly reducing the input shaft rotation speed NI to the synchronized rotation speed.

When the input shaft rotation speed NI has been reduced to the synchronized rotation speed, the torque boost amount of the engine 1000 is gradually reduced. In this way, at the final stage of the inertia phase, the output torque from the engine 1000 is not varied, and only the torque capacities of the two frictional engagement devices are varied.

Varying only the torque capacity of two frictional engagement devices is controlled more easily than varying the output torque Te from the engine 1000 in addition to the torque capacity of two frictional engagement devices. Thus, it is possible to keep variation in the output torque To from the automatic transmission 2000 small.

As described above, with the ECU that functions as the controller according to the embodiment, when the rate of change in the input shaft rotation speed NI has reached the desired rate of change ΔN(1), the gradual reduction of the torque capacity Tch of the frictional engagement device that is brought from an engaged state into a disengaged state by the downshift operation is stopped. Thus, it becomes possible to prevent the torque capacity Tch of the frictional engagement device from being unnecessarily reduced. Accordingly, it becomes possible to prevent the output torque from the automatic transmission from being reduced during an inertia phase. As a result, it becomes possible to keep small the variation in the output torque during transition from an inertia phase to a torque phase.

In an inertia phase, when a situation is brought about in which the input shaft rotation speed NI of the automatic transmission is higher than the synchronized rotation speed within the predetermined range, the torque capacity Tch of the frictional engagement device that is brought into a disengaged state is gradually reduced, and the torque capacity Tcl of the frictional engagement device that is brought into an engaged state is gradually increased, while maintaining a relation between the torque capacities Tch and Tcl such that the output torque To at the end of an inertia phase and the output torque To at the start of the subsequent torque phase are equalized to each other. In this way, the curves of the output torque To are smoothly connected at the point of the transition from an inertia phase to a torque phase. Thus, it is possible to keep small the variation in the output torque To during transition from an inertia phase to a torque phase.

When the input shaft rotation speed NI of the automatic transmission is equalized to the synchronized rotation speed, the amount of boost of the torque from the engine is gradually reduced, and the torque capacity Tch of the frictional engagement device that is brought into a disengaged state is gradually reduced with the start and end of the reduction of the torque boost amount and the torque capacity in the torque phase synchronized. Thus, it is possible to prevent the torque capacity Tch of the frictional engagement device from becoming excessive or insufficient in relation to the input torque Tt supplied to the automatic transmission during the torque phase. Thus, it is possible to keep variation in the output torque from the automatic transmission 2000 small.

In addition, in a state where the input shaft rotation speed NI is higher than the synchronized rotation speed within a predetermined range, the torque capacity Tch of the frictional engagement device that is brought into a disengaged state is gradually reduced, and the torque capacity Tcl of the frictional engagement device that is brought into an engaged state is gradually increased, whereby the input shaft rotation speed NI is reduced to the synchronized rotation speed. Thus, it is possible to keep small the variation in the output torque To from the automatic transmission during a shift by smoothly reducing the input shaft rotation speed NI to the synchronized rotation speed.

When the input shaft rotation speed NI is reduced to the synchronized rotation speed, the torque boost amount of the engine is gradually reduced. In this way, at the final stage of the inertia phase, the output torque from the engine is not varied, and only the torque capacities of the two frictional devices are varied. Thus, it is possible to keep variation in the output torque To from the automatic transmission small.

It should be noted that, instead of stopping the gradual reduction of the torque capacity Tch of the frictional engagement device that is brought from an engaged state into a disengaged state by a downshift operation when the rate of change in the input shaft rotation speed NI has reached the desired rate of change ΔN(1), the gradual reduction of the torque capacity Tch may be stopped when the rate of change in the speed ratio has reached a predetermined desired value.

In addition, instead of controlling the torque capacity Tch so as to maintain the rate of change in the input shaft rotation speed NI at the desired rate of change ΔN(1), control may be performed so as to maintain the rate of change in the speed ratio at a desired value after stopping the gradual reduction of the torque capacity Tch. In these cases, the speed ratio may be calculated by dividing the output shaft rotation speed by the input shaft rotation speed NI.

While the invention has been described with reference to example embodiments thereof, it is to be understood that the invention is not limited to the described embodiments or constructions. To the contrary, the invention is intended to cover various modifications and equivalent arrangements. In addition, while the various elements of the described embodiments are shown in various example combinations and configurations, other combinations and configurations, including more, less or only a single element, are also within the spirit and scope of the invention.

What is claimed is:

1. An apparatus for controlling a power train, comprising:
an automatic transmission that performs a downshift from a higher gear to a lower gear, wherein a frictional engagement device that is in an engaged state is brought into a disengaged state;
a driving power source connected to the automatic transmission, wherein output torque from the driving power source is boosted during the downshift of the automatic transmission;
a first control portion that controls the frictional engagement device so that an inertia phase is started at the time of the downshift by gradually reducing torque capacity of the frictional engagement device; and
a second control portion that stops the gradual reduction of the torque capacity of the frictional engagement device when at least one of rate of change in rotation speed of a rotary member of the automatic transmission, and rate of change in speed ratio of the automatic transmission has reached a predetermined value.

2. The apparatus for controlling a power train according to claim 1, further comprising
a third control portion that, after the gradual reduction of the torque capacity of the frictional engagement device is stopped, controls the torque capacity of the frictional engagement device according to input torque supplied to the automatic transmission, and controlling the torque capacity of the frictional engagement device so that at least one of the rate of change in the rotation speed of the rotary member of the automatic transmission, and the rate of change in the speed ratio of the automatic transmission is maintained at the predetermined value.

3. An apparatus for controlling a power train comprising:
an automatic transmission that performs a downshift from a higher gear to a lower gear, wherein a first frictional engagement device that is in an engaged state is brought into a disengaged state, and a second frictional engagement device that is in a disengaged state is brought into an engaged state; and a driving power source connected to the automatic transmission, wherein output torque from the driving power source is boosted during the downshift of the automatic transmission;
a first control portion that controls the power train so that rotation speed of an input shaft of the automatic transmission becomes higher than a synchronized rotation speed with respect to the lower gear within a predetermined range in an inertia phase of the downshift;
a second control portion that performs control so that torque capacity of the first frictional engagement device is gradually reduced, and that torque capacity of the second frictional engagement device is gradually increased when the rotation speed of the input shaft of the automatic transmission becomes higher than the synchronized rotation speed with respect to the lower gear within the predetermined range in the inertia phase of the downshift; and
a third control portion that performs control so that reduction of an amount of boost of the output torque from the driving power source is started after the rotation speed of the input shaft is reduced to the synchronized rotation speed.

4. An apparatus for controlling a power train comprising:
an automatic transmission that performs a downshift from a higher gear to a lower gear, wherein a first frictional engagement device that is in an engaged state is brought into a disengaged state, and a second frictional engagement device that is in a disengaged state is brought into an engaged state;
a driving power source connected to the automatic transmission, wherein output torque from the driving power source is boosted during the downshift of the automatic transmission; and
a control portion that performs control so that torque capacity of the first frictional engagement device and torque capacity of the second frictional engagement device are gradually reduced and increased, respectively, in an inertia phase, while maintaining a relation between the torque capacities such that the output torque from the automatic transmission at the end of the inertia phase of the downshift and the output torque from the automatic transmission at the start of a subsequent torque phase of the downshift are equalized to each other.

5. An apparatus for controlling a power train comprising:
an automatic transmission that performs a downshift from a higher gear to a lower gear, wherein a frictional engagement device that is in an engaged state is brought into a disengaged state;
a driving power source connected to the automatic transmission, wherein output torque from the driving power source is boosted during the downshift of the automatic transmission;
a first control portion that performs control so that reduction of an amount of boost of the output torque from the driving power source and reduction of torque capacity of the frictional engagement device in a torque phase of the downshift are synchronously started; and
a second control portion that performs control so that the reduction of the amount of boost of the output torque from the driving power source and the reduction of the torque capacity of the frictional engagement device in the torque phase of the downshift are synchronously completed.

6. A method of controlling a power train including: an automatic transmission that performs a downshift from a higher gear to a lower gear, wherein a frictional engagement device that is in an engaged state is brought into a disengaged state; and a driving power source connected to the automatic transmission, wherein output torque from the driving power source is boosted during the downshift of the automatic transmission, the method comprising:
controlling the frictional engagement device so that an inertia phase is started at the time of the downshift by gradually reducing torque capacity of the frictional engagement device; and
stopping the gradual reduction of the torque capacity of the frictional engagement device when at least one of rate of change in rotation speed of a rotary member of the automatic transmission, and rate of change in speed ratio of the automatic transmission has reached a predetermined value.

7. The method of controlling a power train according to claim 6, further comprising,
after the gradual reduction of the torque capacity of the frictional engagement device is stopped, controlling the torque capacity of the frictional engagement device according to input torque supplied to the automatic transmission, and
controlling the torque capacity of the frictional engagement device so that at least one of the rate of change in the rotation speed of the rotary member of the automatic transmission, and the rate of change in the speed ratio of the automatic transmission is maintained at the predetermined value.

8. A method of controlling a power train including: an automatic transmission that performs a downshift from a higher gear to a lower gear, wherein a first frictional engagement device that is in an engaged state is brought into a disengaged state, and a second frictional engagement device that is in a disengaged state is brought into an engaged state; and a driving power source connected to the automatic transmission, wherein output torque from the driving power source is boosted during the downshift of the automatic transmission, the method comprising:
controlling the power train so that rotation speed of an input shaft of the automatic transmission becomes higher than a synchronized rotation speed with respect to the lower gear within a predetermined range in an inertia phase of the downshift;
performing control so that torque capacity of the first frictional engagement device is gradually reduced, and that torque capacity of the second frictional engagement device is gradually increased when the rotation speed of the input shaft of the automatic transmission becomes higher than the synchronized rotation speed with respect to the lower gear within the predetermined range in the inertia phase of the downshift; and
performing control so that reduction of an amount of boost of the output torque from the driving power source is started after the rotation speed of the input shaft is reduced to the synchronized rotation speed.

9. A method of controlling a power train including: an automatic transmission that performs a downshift from a higher gear to a lower gear, wherein a first frictional engagement device that is in an engaged state is brought into a disengaged state, and a second frictional engagement device that is in a disengaged state is brought into an engaged state; and a driving power source connected to the automatic transmission, wherein output torque from the driving power source is boosted during the downshift of the automatic transmission, the method comprising:
performing control so that torque capacity of the first frictional engagement device and torque capacity of the second frictional engagement device are gradually reduced and increased, respectively, in an inertia phase, while maintaining a relation between the torque capacities such that the output torque from the automatic transmission at the end of the inertia phase of the downshift and the output torque from the automatic transmission at the start of a subsequent torque phase of the downshift are equalized to each other.

10. A method of controlling a power train including: an automatic transmission that performs a downshift from a higher gear to a lower gear, wherein a frictional engagement device that is in an engaged state is brought into a disengaged state; and a driving power source connected to the automatic transmission, wherein output torque from the driving power source is boosted during the downshift of the automatic transmission, the method comprising:
performing control so that reduction of an amount of boost of the output torque from the driving power source and reduction of torque capacity of the frictional engagement device in a torque phase of the downshift are synchronously started; and performing control so that the reduction of the amount of boost of the output torque from the driving power source and the reduction of the torque capacity of the frictional engagement device in the torque phase of the downshift are synchronously completed.

11. A computer-readable storage medium storing a program that causes a computer to perform the control method according to claim 6.

* * * * *